United States Patent [19]

Gutleber

[11] 4,245,326
[45] Jan. 13, 1981

[54] IMPULSE AUTOCORRELATION FUNCTION CODE GENERATOR

[75] Inventor: Frank S. Gutleber, Wayne, N.J.

[73] Assignee: International Telephone and Telegraph Corporation, New York, N.Y.

[21] Appl. No.: 664,115

[22] Filed: Aug. 29, 1967

[51] Int. Cl.$^2$ .............................................. G06F 15/34
[52] U.S. Cl. ...................................... 364/728; 340/345; 340/348; 343/100 CL
[58] Field of Search .......................... 325/30, 143, 163; 340/204, 345, 348, 349; 332/11; 178/113; 235/181; 343/5 DP, 17.1, 100.7, 17.1 R, 100 CL; 364/819, 728

[56] References Cited

U.S. PATENT DOCUMENTS 3,955,197  5/1976  Gutleber et al. ............... 343/100 CL Primary Examiner—Howard A. Birmiel
Attorney, Agent, or Firm—Alfred C. Hill

[57] ABSTRACT

Code mates having cooperating autocorrelation functions to produce an impulse autocorrelation function are utilized. The code is bi-phase generated with phases of 0° and 180° and the mate code is bi-phase generated with phases of +90° and −90°. The resultant outputs are linearly combined to yield a single quaternary or quintuple code of the pseudo-noise class, that is, an impulse autocorrelation function. The quaternary code results when the code mates are binary codes. The quintuple code results when the code mates are ternary codes, where no output represents the third code.

10 Claims, 3 Drawing Figures

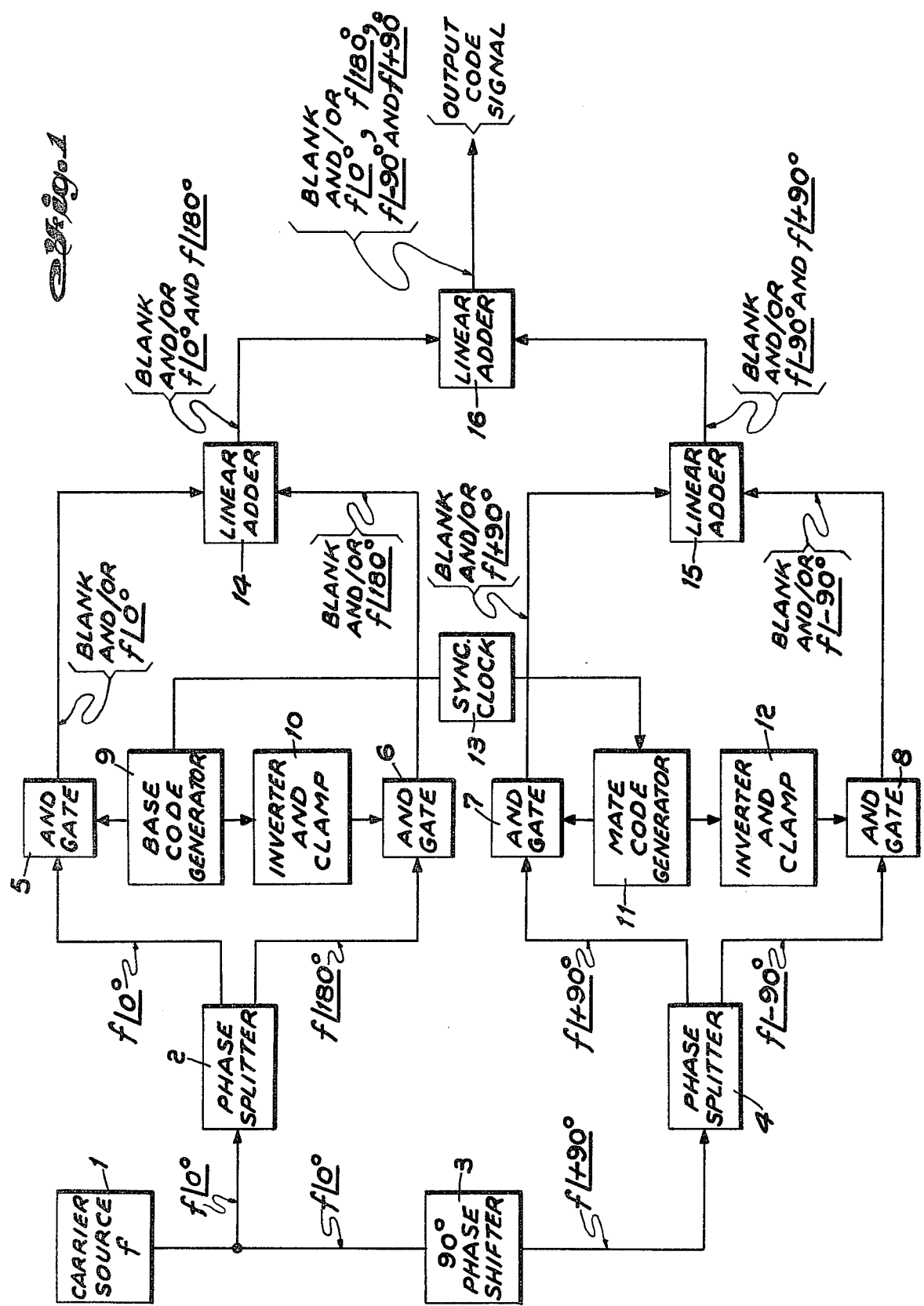

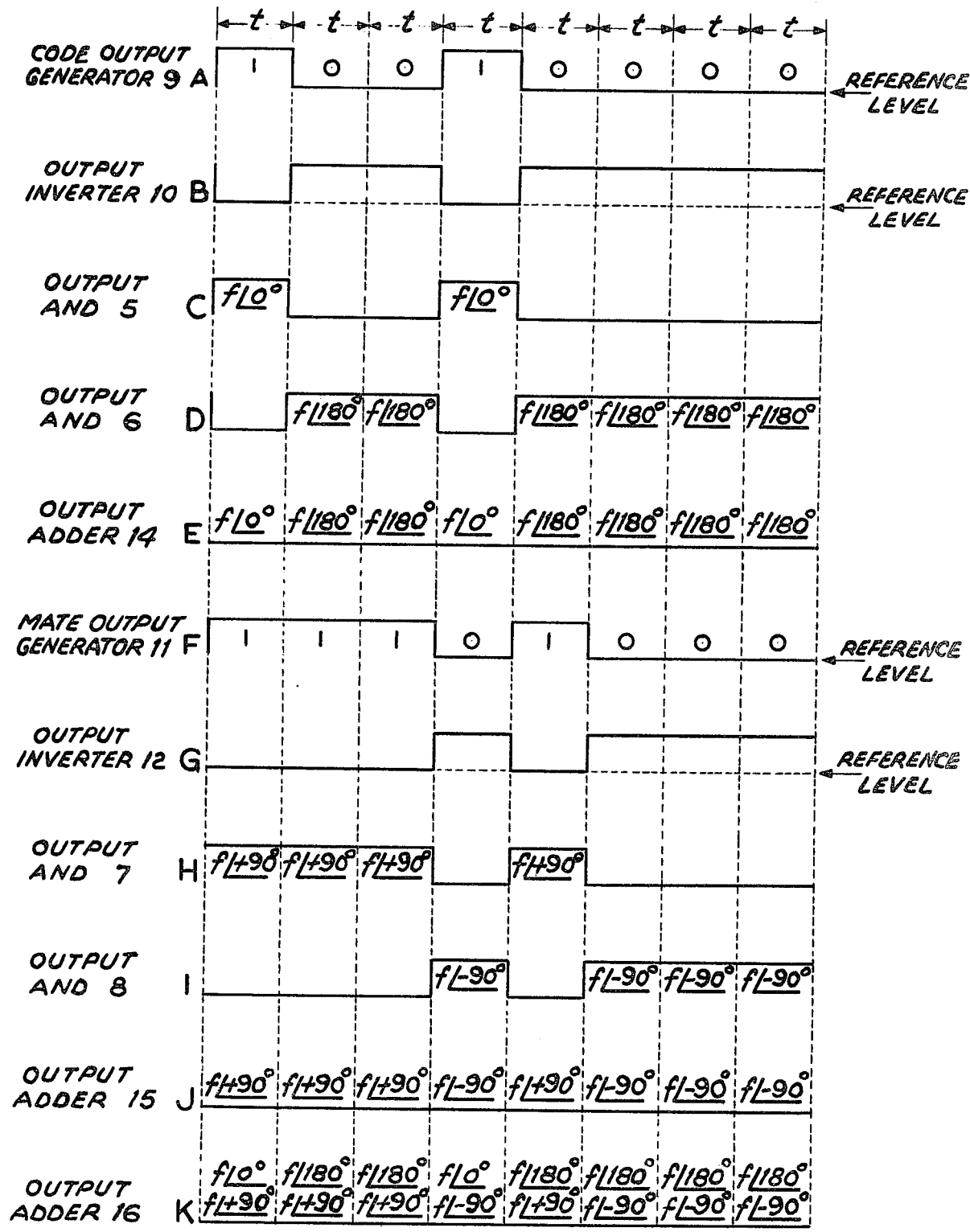

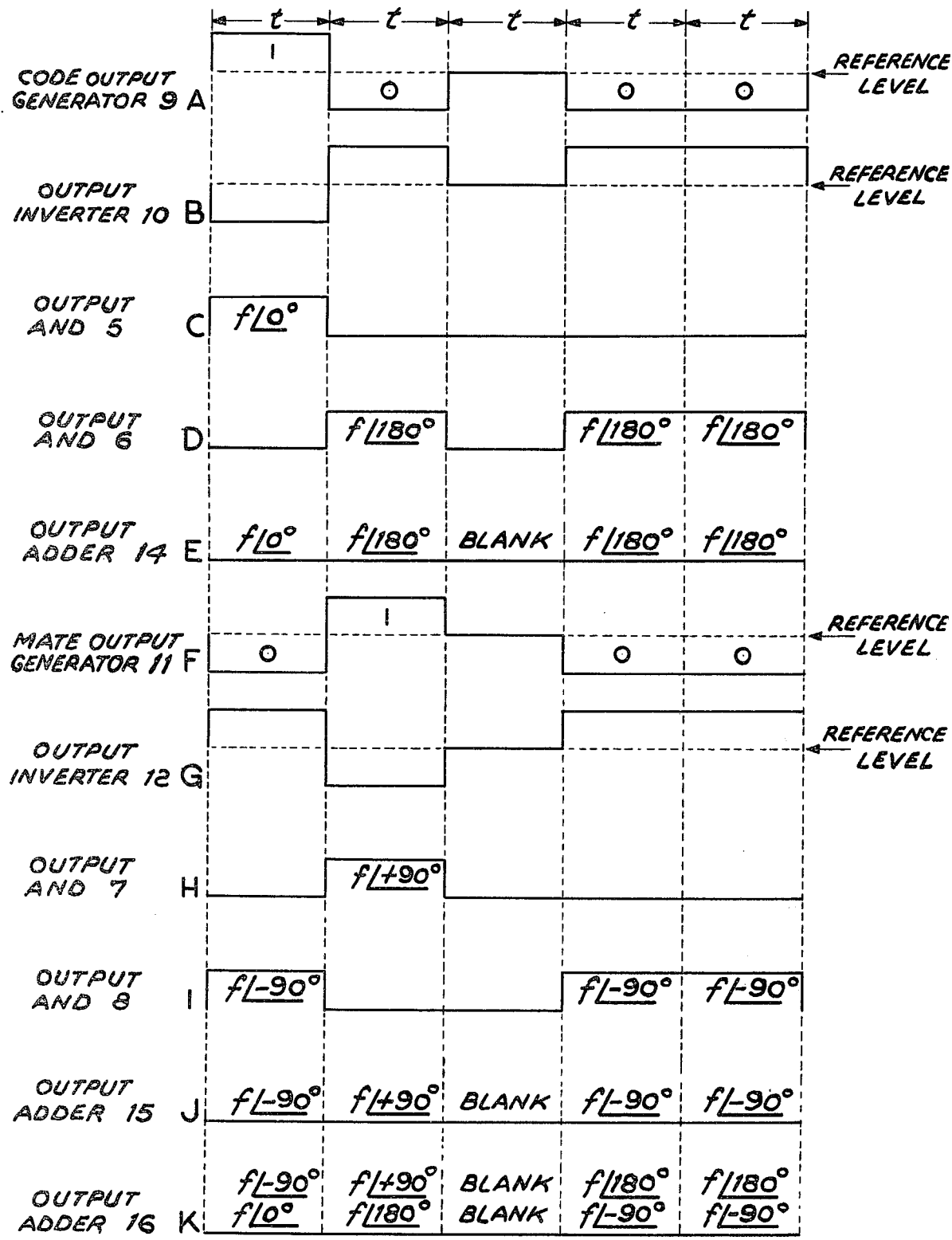

IMPULSE AUTOCORRELATION FUNCTION CODE GENERATOR

BACKGROUND OF THE INVENTION

This invention relates to pulse signalling systems of the code type and more particularly to an improved autocorrelation technique for use in such pulse signalling systems.

Correlation techniques have been utilized in the past in signal processing systems employing signals in the form of a pulse or sequence of pulses. Such pulse signalling systems include, for example, radiant energy reflecting systems, such as radar, radio range finders, radio altimeters, and the like; pulse communication systems, such as over-the-horizon systems employing various types of scatter techniques, satellite communication systems and the like; and multiple access systems employing address codes to enable utilization of the multiple access system. Correlation techniques when employed in coded radiant energy reflection systems enhance the resolution of closely spaced reflecting surfaces and in addition, increase the average power transmitted. Correlation techniques employed in pulse communication systems result in increased signal-to-noise ratios without increase of transmitter power and minimize multiple paths affects (fading). Correlation techniques when employed in a multiple access environment also result in increased signal-to-noise ratio without increase of transmitter power and if properly coded prevents or at least minimizes the interference or crosstalk between one or more address codes.

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting system is reduced, the signal-to-noise ratio of pulse communication systems and multiple access systems and the minimization of multiple path affects of pulse communication systems is reduced to a level below the optimum value.

Previously a number of improved correlation technique have been proposed that will result in an impulse correlation function. The term "impulse correlation function", and more specifically, "impulse autocorrelation function", as employed herein, refers to a waveform having a single high amplitude peak completely free from spurious peaks of lower amplitude elsewhere in the waveform.

One of the proposed improved correlation techniques which is related to the present invention is fully disclosed in the copending application of F. S. Gutleber, Ser. No. 645,697, filed June 13, 1967, (hereinafter referred to as "said first copending application"). Said first copending application discloses a class of codes including two codes, termed code mates, where the code mates have cooperating autocorrelation functions so that when they are autocorrelation detected and the resultant detected outputs are linearly added there is provided an impulse autocorrelation function having an impulse output at a given time and a zero output at all other times. The code mates generated are time or frequency multiplexed for transmission to the detector to provide long code sequences to increase the average transmitting power. The transmitted multiplex code mates are separated consistent with the type of multiplexing being employed prior to autocorrelation detection and linear addition. The number of code mates can be increased in accordance with said first copending application by interleaving each of the original code mates and the different time displaced versions thereof to provide a plurality of first codes and interleaving one code mate and the complemented version of the other code mate of each of the original code mates and the different time displaced versions thereof to provide a code mate for each of the first codes. This process of increasing the number and length of code mates can be continued repeatedly with the newly generated codes mates to further increase the number and length of code mates.

Another of the proposed improved autocorrelation techniques which is related to the present invention is fully disclosed in the copending application of F. S. Gutleber, Ser. No. 671,382, filed Sept. 28, 1967, (referred to hereinafter as "said second copending application"). Said second copending application discloses another class of codes employing code mates having cooperating autocorrelation functions so that when they are detected and the resultant detected outputs are linearly added together there is provided the desired impulse autocorrelation function. As in said first copending application the code mates generated are time or frequency mutliplexed for transmission to the detector to provide long code sequences to increase the average transmitting power. Unlike said first copending application, the code mates of said second copending application do not require complete fill-in but rather may include blank digit time slots of any given number at the end of a code prior to repetition thereof, or the blank slots may be disposed between the first and last time slots which are required to have a digit of either of two conditions, such as binary "1" or "0". The number and length of code mates can be increased in accordance with said second copending application by employing the interleaving processes called for in the equations of FIG. 5 thereof. Each of the new code mates thusly generated may be processed according to the equations of FIG. 5 to form still other new code mates. This process may be continued repeatedly for each new code mate generated to further increase the number and length of code mates.

Still another proposed improved correlation technique which is related to the present invention is fully disclosed in the copending application of F. S. Gutleber, Ser. No. 669,899, filed Sept. 22, 1967, (referred to hereinafter as "said third copending application") said third copending application discloses still another arrangement utilizing the code mates of said first and second copending applications to expand the number of code mates and the length of the code mates. The number and length of code mates can be increased in accordance with said third copending application by employing the butting process called for in the equations of FIG. 1 thereof. Each of the new code mates thusly generated may be processed according to the equations

3 of FIG. 1 to form still other new code mates. This process may be continued repeatedly for each new code mate generated to further increase the number and length of code mates.

SUMMARY OF THE INVENTION

An object of the present invention is to provide a code generator that will produce an output code of at least the quaternary type having an impulse autocorrelation function.

Another object of the present invention is to provide a code generator that will produce an output code of the quintuple type having an impulse autocorrelation pulse.

A further object of the present invention is to provide a code generator as mentioned above utilizing the techniques disclosed in said first, second and third copending applications to cooperate in producing the desired output codes.

A feature of this invention is the provision of a code generator comprising a source of four carrier signals each having the same frequency and a different phase thereof, first means to provide first and second code signals each having at least two different code conditions and cooperating autocorrelation functions to produce an impulse autocorrelation function having an impulse output at a given time and a zero output at all other times, second means coupled to the source and the first means responsive to the first code signal to represent one of the two code conditions thereof by a first of the four carrier signals and the other of the two code conditions thereof by a second of the four carrier signals, third means coupled to the source and the first means responsive to the second code signal to represent one of the two code conditions thereof by the third of the four carrier signals and the other of the two code conditions thereof by the fourth of the four carrier signals, and fourth means coupled to the second and third means to combine the outputs therefrom to produce an output code signal of at least the quaternary type having the desired impulse autocorrelation function.

Another feature of this invention is the provision of first and second code signals for utilization in the above code generator which include a third code condition in at least one digit time slot thereof to provide an output code signal of the quintuple type.

BRIEF DESCRIPTION OF THE DRAWING

The above mentioned and other features and objects of this invention will become more apparent by reference to the following description taken in conjunction with the accompanying drawings, in which:

FIG. 1 is a block diagram of the code generator in accordance with the principles of this invention; and FIGS. 2 and 3 are time diagrams illustrating the operation of the generator of FIG. 1.

DESCRIPTION OF THE PREFERRED EMBODIMENT

Referring to FIG. 1, there is disclosed a block diagram of the code generator in accordance with the principle of this invention which utilizes code mates as disclosed in said first and second copending applications with the code being bi-phase generated with the phases of 0° and 180° and the mate code bi-phase generated with the phases of +90° and −90°. The resultant coded outputs are then linearly combined to yield a single quaternary code or a single quintuple code of the pseudonoise class, that is, the autocorrelation functions thereof contained one peak or impulse imbedded in all zeroes, in other words, an impulse autocorrelation function. Whether a quaternary code or a quintuple code is generated depends upon the type of code produced by the base code and mate code generators. Where the code mates are pure binary codes the resultant output code is of the quaternary type while if the code mates are simple ternary codes the resultant output code is of the quintuple type.

More specifically four carrier signals having the same frequency by the different phases are generated by a carrier source 1 whose output is coupled to phase splitter 2 to produce a 0° carrier phase and a 180° carrier phase. The output of source 1 is also coupled to 90° phase shifter 3 whose output is coupled to phase splitter 4 to provide the carrier frequency with a +90° phase and a −90° phase. The outputs from phase splitter 2 are coupled to AND gates 5 and 6 as illustrated. The outputs from phase splitter 4 are coupled to AND gates 7 and 8 as illustrated. The output from AND gate 5 is controlled by the base code output of generator 9 while the output from AND gate 6 controlled by the output of inverter and clamp 10 coupled to generator 9. The output of AND gate 7 is controlled by the mate code produced in generator 11 and the output from AND gate 8 is controlled by the output of inverter and clamp 12 coupled to generator 11. The operation of generators 9 and 11 are synchronized by the output of the synchronizing clock 13. The carrier signal with phase 0°, as controlled by the code output of generator 9, is coupled to linear adder 14 and the carrier signal of 180° phase, as controlled by the inverted code output of inverter and clamp 10, is also coupled to linear adder 14. The outputs of AND gates 7 and 8, namely, carrier signal at +90° phase and carrier signal at −90° phase is coupled under control of the output of the generator 11 and the output of inverter and clamp 12, to linear added 15. The output from linear adders 14 and 15 are coupled to linear adder 16 to provide the output code either of the quaternary or quintuple type depending upon the type of code mates being generated in generators 9 and 11.

Referring to FIG. 2, there is illustrated for purposes of explanation code mates #4 and #14 of said first copending application whose format is illustrated in Curves A and F. The code output of Curve A from generator 9 controls AND gate 5 so that carrier signal with 0° phase is passed therethrough during the digit time slots having a binary "1" condition therein as illustrated in Curve C. The code of Curve A is inverted in inverter and clamp 10 and clamped at the reference level so that the digit time slots originally containing a binary "0" condition now have the proper polarity to control AND gate 6. The output of inverter and clamp 10 is illustrated in Curve B and the output of AND gate 6, controlled by the signal of Curve B, is illustrated in curve D. The outputs of AND gates 5 and 6 as illustrated in Curves C and D are coupled to adder 14 and produce an output therefrom as illustrated in Curve E.

In a similar manner the output of generator 11 controls AND gate 7 to provide the output as illustrated in Curve H. As mentioned in connection inverter and clamp 10, inverter and clamp 12 inverts the code mate of Curve F and clamps it to the reference level to provide the control signal output as illustrated in Curve G. Under control of the signal of curve G. AND gate 8 provides the output as illustrated in Curve I. The output signals of Curves H and I produce at the output of adder 15 the signal illustrated in Curve J. Linear adder 16 adds the signals of Curves E and J to provide the output code which in this instance is of the quaternary type as illustrated in Curve K.

Referring to FIG. 3, the operation of FIG. 1 will now be described where the code and code mate are of the ternary type, such as codes #20 and #21 of said second copending application. The code is illustrated in Curve A wherein the third digit time slot has no output and represents the third code condition while the other four digit time slots have either of two code conditions, such as "1" and "0". The code mate illustrated in Curve F is a code similar to that of Curve A but has the desired cooperating autocorrelation function therewith to provide an impulse autocorrelation function when detected. Curve B illustrates the inverted and clamped output of inverter and clamp 10 with the inversion and clamping being necessary to provide the "0" condition digit time slots with the proper polarity to control the associated AND gate. The output from AND gate 5 illustrated in Curve C and the output from AND gate 6 is illustrated in Curve D. The operation of AND gates 5 and 6 is controlled by the signals illustrated in Curves A and B respectively. The output of adder 14 is illustrated in Curve E. The output of inverter and clamp 12 is illustrated in Curve G and the output from AND gates 7 and 8, under control of the signals illustrated in Curves F and G, respectively, are illustrated in Curves H and I. The resultant output from adder 15 is illustrated in Curve J. Adder 16 combines Curves E and J to provide the output code signal as illustrated in Curve K which in this instance is a quintuple type code signal due to the ternary type code of the code mates.

Code generators 9 and 11 may be any of the fundamental code generators disclosed in FIG. 19 of said first copending application, FIGS. 15, 17 and 19 of said second copending application and FIG. 4 of said third copending application. Also generators 9 and 11 may be rearranged to provide a single source of an expanded code and its mate as produced by the systems disclosed in FIG. 19 of said first copending application, FIG. 13 of said second copending application and FIG. 4 of said third copending application. These systems are those employed to carry out the expansion processes disclosed in the three copending applications. For utilization in the code generator of the present invention, the expanded code output would provide an input to AND gate 5 and inverter and clamp 10 while the mate for the expanded code provides an input to AND gate 7 and inverter and clamp 12.

As illustrated by the timing diagrams of FIGS. 2 and 3, the code generator of the present invention will operate with code mates of the complete fill-in type as disclosed in said first copending application and also will work for code mates of the gapped and incomplete fill-in types disclosed in said second copending application where the blank digit time slot or slots of the gapped and incomplete code fill-in type codes are time coincident without any difficulty in detection by correlation or matched filter techniques. The code generator also will produce a multi-phase type output code even when the blank digit time slot or slots are not in time coincident which would result in a phase output and a blank output occurring in time coincident digit time slots.

While I have described above the principles of my invention in connection with specific apparatus it is to be clearly understood that this description is made only by way of example and not as a limitation to the scope of my invention as set forth in the objects thereof and in the accompanying claims.

I claim:

1. A code generator comprising:
    a source of four carrier signals each having the same frequency and a different phase thereof;
    first means to provide first and second code signals each having at least two different code conditions and cooperating autocorrelation functions to produce an impulse autocorrelation function having an impulse output at a given time and a zero output at all other times;
    second means coupled to said source and said first means responsive to said first code signal to represent one of said two code conditions thereof by a first of said four carrier signals and the other of said two code conditions thereof by a second of said four carrier signals;
    third means coupled to said source and said first means responsive to said second code signal to represent one of said two code conditions thereof by the third of said four carrier signals and the other of said two code conditions thereof by the fourth of said four carrier signals; and
    fourth means coupled to said second and third means to combine the outputs therefrom to produce an output code signal of at least the quaternary type having said impulse autocorrelation function.

2. A generator according to claim 1, wherein said second means includes
    a first AND gate coupled to said source and said first means responsive to said first code signal to control the output of said first of said four carrier signals,
    an inverter coupled to said first means to invert said first code signal, and
    a second AND gate coupled to said source and said inverter responsive to said inverted first code signal to control the output of said second of said four carrier signals.

3. A generator according to claim 1, wherein said third means includes
    a first AND gate coupled to said source and said first means responsive to said second code signal to control the output of said third of said four carrier signals,
    an inverter coupled to said first means to invert said second code signal, and
    a second AND gate coupled to said source and said inverter responsive to said inverted second code signal to control the output of said fourth of said four carrier signals.

4. A generator according to claim 1, wherein said fourth means includes
    a first linear adder coupled to said second means to combine said first and second of said four carrier signals,
    a second linear adder coupled to said third means to combine said third and fourth of said four carrier signals, and
    a third linear adder coupled to said first and second linear adders to combine the output signals therefrom to produce said output code signal.

5. A generator according to claim 1, wherein said first and second code signals each include a third code condition in at least one digit time slot thereof, and said output code signal is of the quintuple type.

6. A generator according to claim 5, wherein said one digit time slot of each of said first and second codes are time coincident.

7. A generator according to claim 1, wherein said first of said four carrier signals has a zero degree phase, said second of said four carrier signals has a 180° phase, said third of said four carrier signals has a +90° phase, and said fourth of said four carrier signals has a −90° phase.

8. A generator according to claim 1, wherein said source includes
- a carrier signal source,
- a first phase splitter coupled to said carrier signal source to provide said first and second of said four carrier signals,
- a 90° phase shifter coupled to said carrier signal source, and
- a second phase splitter coupled to said phase shifter to provide said third and fourth of said four carrier signals.

9. A generator according to claim 1, wherein said second means includes
- a first AND gate coupled to said source and said first means responsive to said first code signal to control the output of said first of said four carrier signals,
- a first inverter coupled to said first means to invert said first code signal, and
- a second AND gate coupled to said source and said first inverter responsive to said inverted first code signal to control the output of said second of said four carrier signals;

said third means includes
- a third AND gate coupled to said source and said first means responsive to said second code signal to control the output of said third of said four carrier signals,
- a second inverter coupled to said first means to invert said second code signal, and
- a fourth AND gate coupled to said source and said second inverter responsive to said inverted second code signal to control the output of said fourth of said four carrier signals; and said fourth means includes
- a first linear adder coupled to said first and second AND gates to combine said first and second of said four carrier signals,
- a second linear adder coupled to said third and fourth AND gates to combine said third and fourth of said four carrier signals, and
- a third linear adder coupled to said first and second linear adders to combine the output signals therefrom to produce said output signal.

10. A generator according to claim 9, wherein said source includes
- a carrier signal source,
- a first phase splitter coupled to said carrier signal source of provide said first and second of said four carrier signals,
- a 90° phase shifter coupled to said carrier signal source, and
- a second phase splitter coupled to said phase shifter to provide said third and fourth of said four carrier signals.

* * * * *